(12) United States Patent
Rudolph et al.

(10) Patent No.: US 8,512,453 B2
(45) Date of Patent: Aug. 20, 2013

(54) DEAERATION AND AERATION SYSTEM FOR A FUEL TANK AND OPERATING METHOD

(75) Inventors: Thomas Rudolph, Stuttgart (DE);
Tilmann Wächter, Stuttgart (DE)

(73) Assignee: Mahle International GmbH (DE)

( * ) Notice: Subject to any disclaimer, the term of this patent is extended or adjusted under 35 U.S.C. 154(b) by 350 days.

(21) Appl. No.: 12/938,840

(22) Filed: Nov. 3, 2010

(65) Prior Publication Data

US 2011/0100219 A1    May 5, 2011

(30) Foreign Application Priority Data

Nov. 4, 2009  (DE) .................. 10 2009 051 860

(51) Int. Cl.
*B01D 53/22* (2006.01)
*B01D 19/00* (2006.01)
*B01D 53/02* (2006.01)

(52) U.S. Cl.
USPC .......... 96/6; 96/131; 96/133; 96/134; 96/174; 96/219; 96/421; 95/19; 95/22; 95/46; 95/146

(58) Field of Classification Search
USPC .................. 96/4, 6, 121, 131, 132, 133, 421, 96/134, 174, 219; 95/19, 22, 45, 46, 90, 95/146
See application file for complete search history.

(56) References Cited

U.S. PATENT DOCUMENTS

| 5,806,500 | A | 9/1998 | Fargo et al. | |
|---|---|---|---|---|
| 6,230,693 | B1 | 5/2001 | Meiller et al. | |
| 6,540,815 | B1 | 4/2003 | Hiltzik et al. | |
| 6,935,318 | B2 * | 8/2005 | Abidi et al. ................. | 96/149 |
| 7,097,697 | B2 * | 8/2006 | Nakamura et al. .......... | 96/134 |
| 7,458,367 | B2 * | 12/2008 | Kasuya ....................... | 96/149 |
| 8,177,894 | B2 * | 5/2012 | Yoshida et al. ............. | 96/134 |
| 2006/0032546 | A1 | 2/2006 | Bolle et al. | |
| 2011/0277630 | A1 * | 11/2011 | Greenough ................. | 95/22 |

FOREIGN PATENT DOCUMENTS

| DE | 19756606 A1 | | 8/1998 |
|---|---|---|---|
| DE | 102004039163 A1 | | 2/2006 |
| JP | 06311715 A | | 11/1994 |
| WO | WO 97/33765 | * | 9/1997 |
| WO | WO-97/33765 A1 | | 9/1997 |

OTHER PUBLICATIONS

English abstract provided for JP-06311715, 1994.

* cited by examiner

*Primary Examiner* — Jason M Greene
(74) *Attorney, Agent, or Firm* — Rader, Fishman & Grauer PLLC (57) ABSTRACT

A fuel tank deaeration and aeration system, including a first main filter device having an inlet and an outlet, wherein the inlet is in fluid communication with a fuel tank; and a second additional filter device having an inlet and an outlet, wherein the inlet is in fluid communication with the outlet of the main filter device, and the additional filter device outlet is in fluid communication with an environment of a vehicle, and wherein a bypass valve controls a bypass, which bypasses the additional filter device.

24 Claims, 7 Drawing Sheets

DEAERATION AND AERATION SYSTEM FOR A FUEL TANK AND OPERATING METHOD

CROSS-REFERENCES TO RELATED APPLICATION

This application claims priority to German patent application DE 10 2009 051 860.6 filed on Nov. 4, 2009, which is hereby incorporated by reference in its entirety.

TECHNICAL FIELD

The invention relates to a deaeration and aeration system for a fuel tank of a motor vehicle with internal combustion engine according to the features of the preamble of the claim 1. The invention includes also a method for operating a deaeration and aeration system of a fuel tank of a motor vehicle with an internal combustion engine.

BACKGROUND

In a fuel tank of a motor vehicle, fuel vapors are generated which basically can escape through a deaeration and/or aeration path into the environment of the vehicle. Such a path connected to the environment is required, e.g., for a pressure compensation. To reduce or avoid such pollutant emissions as far as possible, deaeration and aeration systems are used which comprise a filter device. Such a filter device which, for example, works with activated carbon, can extract hydrocarbons from a gas flow by means of sorption, thus by means of adsorption and/or absorption. By backwashing the filter device, for example with ambient air, embedded hydrocarbons can be removed by means of desorption in order to regenerate the filter device or its storage material.

In vehicle applications, in particular, the following states are differentiated from each other:

Refueling process or ORVR (Onboard Refueling Vapor Recovery). During refueling the stationary vehicle with the internal combustion engine turned off, an air-fuel vapor mixture is displaced by the fuel flowing into the tank, among other things, in the direction of the environment. In order that statutory emission limit values are not exceeded here, the deaeration and aeration system adsorbs the pollutants contained in the gas that flows out.

Vehicle standstill or DBL (Diurnal Bleeding Loading). With the vehicle stationary and the internal combustion engine turned off, diffusion processes and thermal expansion effects result in the spread of hydrocarbon-containing gases from the vehicle tank toward the environment. In order that here, too, the statutory emission limit values are not exceeded, the deaeration and aeration system adsorbs the pollutants contained in the gas that flows out.

Washing. With the internal combustion engine turned on, thus in particular during a driving operation of the vehicle, air from the environment is sucked in by the deaeration and aeration system, whereby the adsorbed pollutants are desorbed and thus the deaeration and aeration system is regenerated.

To be able to prevent or reduce the pollutant emission in different states over a sufficiently long period of time, there is the possibility to equip the respective filter device with a comparatively large storage volume for a suitable sorption material which, in particular, can be distributed over a plurality of chambers through which a flow can pass in succession. In order that the storage material does not have an inadmissibly high flow resistance it has to be structured once a certain amount or a certain volume is reached, which involves a significant effort.

From U.S. Pat. No. 6,540,815 B1, a deaeration and aeration system is known by means of which the emission values for a fuel tank of a motor vehicle with internal combustion engine can be reduced. For this purpose, the deaeration and aeration system is equipped with a main filter device which has an outlet and an inlet that is fluidically connectable to the fuel tank, and is equipped with an additional filter device which has an inlet that is fluidically connected to the outlet of the main filter device and an outlet that is fluidically connectable to the environment of the vehicle. The known deaeration and aeration system is operated in such a manner that during a standstill of the vehicle with the internal combustion engine turned off, gas escaping from the tank is conveyed through a main filter device and subsequently through an additional filter device and into the environment, and that during a driving operation of the vehicle with the internal combustion engine turned on, air from the environment is sucked in through the additional filter device and subsequently through the main filter device.

SUMMARY

To be able to ensure a sufficient emission protection for longer service life of the vehicle, the additional filter device of the known deaeration and aeration system can comprise a monolithic and carbon-containing adsorption body which is penetrated by a plurality of individual parallel channels and which is characterized by a low flow resistance and a quick washability, whereby it is available again for loading within a relatively short time. The disadvantage of the use of such a monolith body compared to a filling of carbon pellets as adsorbent is the high production cost.

The present invention is concerned with the problem to provide for a deaeration and aeration system of the aforementioned type and, respectively, for an associated operating method, an improved embodiment which is in particular characterized in that it offers a particularly effective emission protection for hydrocarbons, wherein it can be implemented at the same time with comparatively low production costs.

This problem is solved according to the invention by the subject matter of the independent claim. Advantageous embodiments are subject matter of the dependent claims.

The invention is based on the general idea to equip the deaeration and aeration system with a main filter device and an additional filter device arranged in series thereto, and a bypass which bypasses the additional filter device. During a fueling process, gas displaced from the tank can escape through the main filter device and subsequently by bypassing the additional filter device through the bypass into the environment of the vehicle. With the vehicle at standstill and with the internal combustion engine turned off, gas escapes from the tank into the main filter device, passes through the same and, with the bypass deactivated, into the additional filter device and passes through the same and into the environment. During the driving operation of the vehicle and deactivated bypass, air is sucked in through the additional filter device and subsequently through the main filter device. Her, the invention utilizes the knowledge that during fueling process, higher limit values for the pollutant emission are admissible than during a standstill of the vehicle and during a driving operation. For the fueling process, the additional filter device can be bypassed by means of the activatable and deactivatable bypass. With the flow passing through the main filter device, the specified pollutant emission values can be met. At the same time, the flow resistance of the additional filter device is eliminated. Thus, a sufficiently quick pressure compensation between tank and environment can be ensured during the fueling process. For the additional filter device, this results in the possibility to implement the same in an economical manner. For example, the sorption material, for example activated carbon, can be used in an unstructured manner, in particular as bulk material, whereby the additional filter device can have particularly low production costs. With the additional filter device and with the bypass closed, a significant increase of the total storage volume available can be achieved for the vehicle standstill. Here, a particularly low flow resistance of the deaeration and aeration system is not important so that in particular also an additional filter device can be used which works with a relatively high flow resistance. Also during the driving operation, thus during backwashing the deaeration and aeration system, the flow resistance of the additional filter device is of minor importance so that here with the bypass closed, a sufficient regeneration of the deaeration and aeration system or the main filter device and the additional filter device can be implemented.

According to a particularly advantageous embodiment, the bypass can be controlled by means of a bypass valve. The bypass valve opens and closes the bypass to activate and deactivate the same, respectively. Preferred here is an embodiment in which the bypass valve works without external energy so that no external energy supply for actuating the bypass valve is required. In particular, electrical or pneumatic control signals or the like, which have to be delivered externally, can be eliminated. The bypass valve works independently which simplifies the integration of the deaeration and aeration system significantly so that the same can be implemented with comparatively low production costs.

According to an advantageous embodiment, the bypass valve can be actuated in dependence on a pressure prevailing in the tank. During refueling the tank, the pressure in the tank increases to a valve that is sufficient to open the bypass valve. For example, the pressure in the tank increases due to the comparatively high flow resistance of the additional filter device which is still active when the bypass is closed. During a standstill of the vehicle with the internal combustion engine turned off, a pressure increase in the tank can occur due to direct sunlight, which pressure increase, however, is smaller than during refueling. It is in particular not sufficient for a pressure-controlled bypass valve to open the bypass valve. During the driving operation of the vehicle, a negative pressure can be generated in the tank to implement the backwashing of the deaeration and aeration system. For this case, the bypass valve is configured in such a manner that it does not open even at a negative pressure.

Further important features and advantages arise from the sub-claims, from the drawings, and from the associated description of the figures based on the drawings.

It is to be understood that the above mentioned features and the features yet to be explained hereinafter can be used not only in the respectively mentioned combination but also in other combinations or alone without departing from the scope of the present invention.

BRIEF DESCRIPTION OF THE DRAWING

Preferred exemplary embodiments of the invention are illustrated in the drawings and are explained in the following description in more detail, wherein identical reference numbers refer to identical, or similar, or functionally identical components.

In the figures, schematically

DETAILED DESCRIPTION

Figure 1:
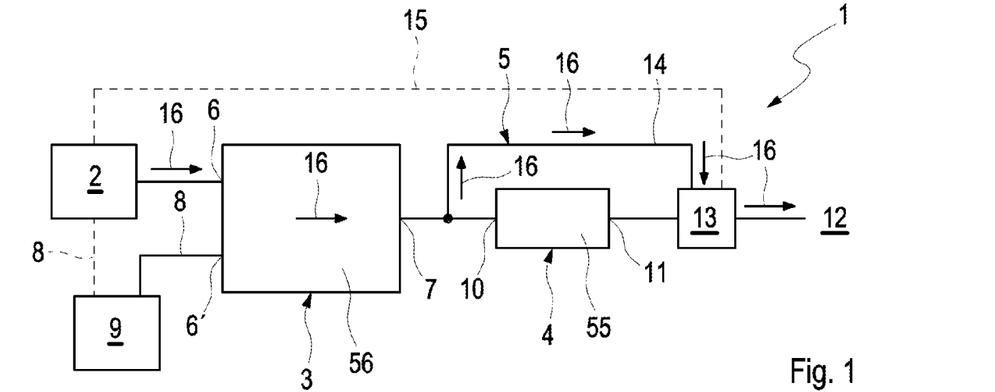
FIGS. 1-3 each show a greatly simplified, diagram-like basic illustration of a deaeration and aeration system in different operating states of a motor vehicle equipped therewith.
Figure 2:
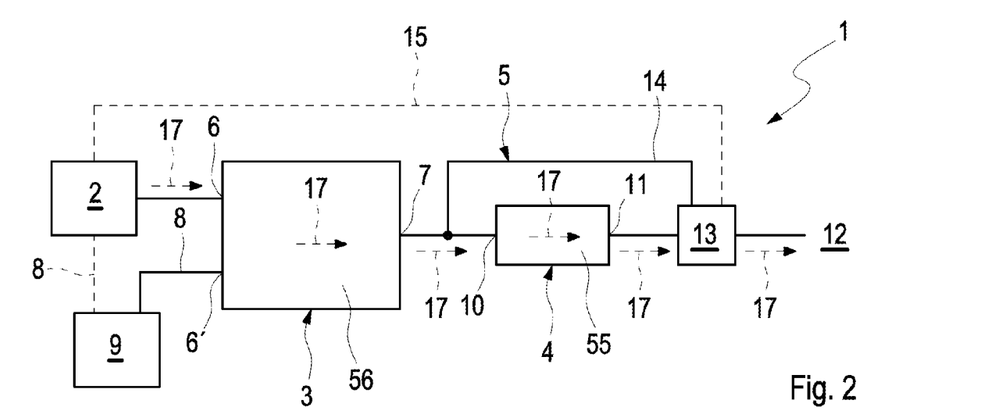
Figure 3:
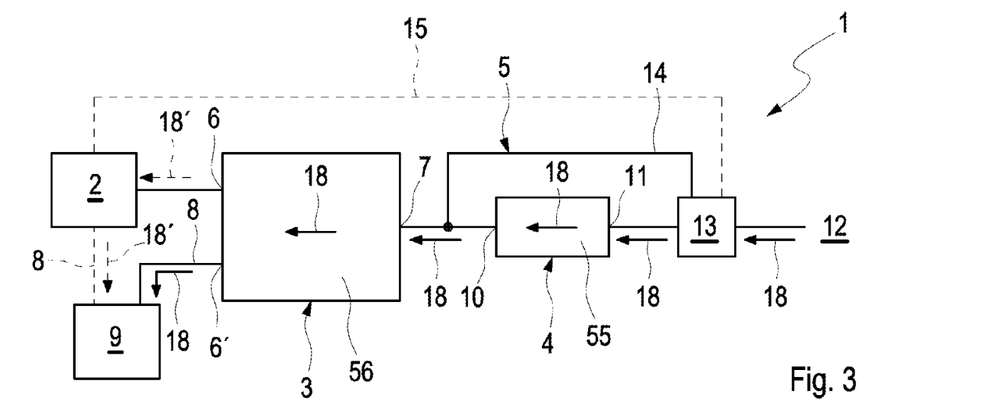

According to the FIGS. 1-4, a deaeration and aeration system 1 by means of which a fuel tank 2 of a non-illustrated motor vehicle can be aerated and deaerated comprises a main filter device 3, an additional filter device 4, and a bypass 5. The main filter device 3 has an inlet 6 to which the fuel tank 2 is fluidically connectable or is mounted to it in the assembled state of the deaeration and aeration system 1. Furthermore, the main filter device 3 has an outlet 7. In the example of FIGS. 1-3, the main filter device 3 is also equipped with an additional inlet 6' to which the fresh air system 8 of an internal combustion engine 9 can be connected or is connected if the deaeration and aeration system 1 is installed in the vehicle. Of the fresh air system 8, only a suitable connection line is indicated here. Alternatively, it is also possible to connect the fresh air line 8 or its connection line corresponding to a broken line to the tank 2 so that the fresh air system 8 is connected to the main filter device 3 via tank 2 and the connection 6 associated to the tank 2.

The additional filter device 4 comprises an inlet 10 which is fluidically connected to the outlet 7 of the main filter device 3. Moreover, the additional filter device 4 has an outlet 11 which, in the assembled state, is fluidically connected to an environment 12 of the vehicle. The bypass 5 bypasses the additional filter device 4. The bypass 5 has a bypass valve 13 and a bypass path 14. The bypass valve 13 is configured and/or arranged in such a manner that the bypass path 14 can be controlled by means of the bypass valve 13. According to a particularly advantageous embodiment, the bypass valve 13 is configured in such a manner that it works without external energy. Thus, a complex connection of the bypass valve 13 to a suitable energy source is not required. Furthermore, a control for actuating the bypass valve 13 is not required. Preferred is an embodiment in which the bypass valve 13 is configured in such a manner that it can be actuated pneumatically. Advantageously, it is connected in such a manner that it is actuated in dependence on a pressure prevailing in the tank 2. A corresponding pneumatic operational connection is indicated in the FIGS. 1-4 by means of a broken line and is designated with 15.

The general functional principle of the deaeration and aeration system 1 introduced herein is explained in more detail hereinafter by means of the FIGS. 1-3.

FIG. 1 shows the situation which arises during a refueling process. Usually, the internal combustion engine 9 is turned off during refueling. During refueling, fuel is filled into the tank 2. In doing so, gas is displaced from the tank 2. The gas is released into the environment 12 via the deaeration and aeration system 1. During said refueling process, the bypass 5 is activated, whereby the additional filter device 4 is deactivated. The deactivation of the additional filter device 4 can also be controlled by means of the bypass valve 13. It is also conceivable that the additional filter device 4 has a much higher flow resistance than the bypass 5 so that when, in addition, the bypass 5 is open, a predominant portion of the gas displaced from the tank 2 flows through the bypass 5. In any case, the gas displaced from the tank 2 is first conveyed through the main filter device 3 and subsequently, by bypassing the additional filter device 4, through bypass and into the environment 12. This flow situation is indicated in FIG. 1 by arrows 16. Hydrocarbons contained in the gas displaced from the tank 2 are sorbed in the main filter device 3. A minor emission of fuel into the environment 12, which can occur due to bypassing the additional filter device 4, is accepted here because of the applicable higher emission limit values admissible during the refueling process.

FIG. 2 shows the situation which arises during a standstill of the vehicle with the internal combustion engine 9 turned off. During said vehicle standstill, due to diffusion processes and due to thermal expansion, a movement or expansion oriented from tank 2 to the environment 12 of vaporous fuel takes place. During said vehicle standstill, the bypass 5 is deactivated so that the additional filter device 4 is active. Consequently, the gas escaping from the tank 2 reaches first the main filter device 3 where the fuels carried along, in particular hydrocarbons, are absorbed by sorption. The gas flows through the main filter device 3 and reaches then the additional filter device 4. Also in the additional filter device 4, a sorption of fuel vapors carried along takes place. Only when the gas flows out of the additional filter device 4, it can escape into the environment 12. The arrows 17 drawn as broken line indicate in FIG. 2 the gas movement during the vehicle standstill. Due to the filter devices 3, 4 through which the gas or gas movement can flow in succession, extremely low emission limit values for said vehicle standstill can be met.

FIG. 3 shows the situation which arises during a driving operation with the internal combustion engine 9 turned on.

During the driving operation, the internal combustion engine 9 sucks air via its fresh air system 8 from the environment 12 at least partially via the deaeration and aeration system 1. Accordingly, air from the environment 12 flows through the additional filter device 4 and subsequently through the main filter device 3. For this purpose, the bypass 5 is deactivated again so that the additional filter device 4 is active. Through this driving operation state, a backwashing of the filter devices 3 and is implemented, whereby the same are regenerated. The sucked in air which backwashes the filter devices 3 and 4 can collect the hydrocarbons embedded in the filter devices 3 and 4 so that the hydrocarbons desorb. Through the fresh air system 8, the fuel vapors carried along in the sucked in air reach the internal combustion engine 9 where they are transformed by combustion. The flow situation arising during the driving operation is indicated in FIG. 3 by arrows 18. The arrows 18' drawn as broken line indicate the flow situation of the aforementioned alternative embodiment in which the internal combustion engine 9 is not connected directly to the main filter device 3 but indirectly via the tank 2.

The filter devices 3 and 4 work with a storage material which, by means of sorption, thus by means of adsorption and/or absorption, collects entrained hydrocarbons from the air and embeds or stores them. Particularly suitable as sorption material is activated carbon; likewise, other suitable adsorption and/or absorption media or adsorber and/or absorber media can also be used. At least in case of the additional filter device 4, the respective sorption material, e.g. the activated carbon, can be inserted as unstructured bulk material into an appropriate additional chamber 55 of the additional filter device 4. This results in a comparatively high flow resistance of the additional filter device 4. However, at the same time, an extremely large surface area of sorption material can be provided. In case of the main filter device 3, the sorption material can be inserted in one main chamber 56 or in a plurality of main chambers 56, wherein here a structured arrangement or a bulk material is used which, compared to the bulk material of the additional filter device 4, has a larger grain size. Hereby, the main filter device 3 has a relatively low flow resistance. In particular, the flow resistance of the main filter device 3 is smaller than the flow resistance of the additional filter device 4. If the main filter device 3 contains two or more main chambers 56, the same are preferably arranged in series within the main filter device 3 so that the flow passes successively through the same.

Figure 4:
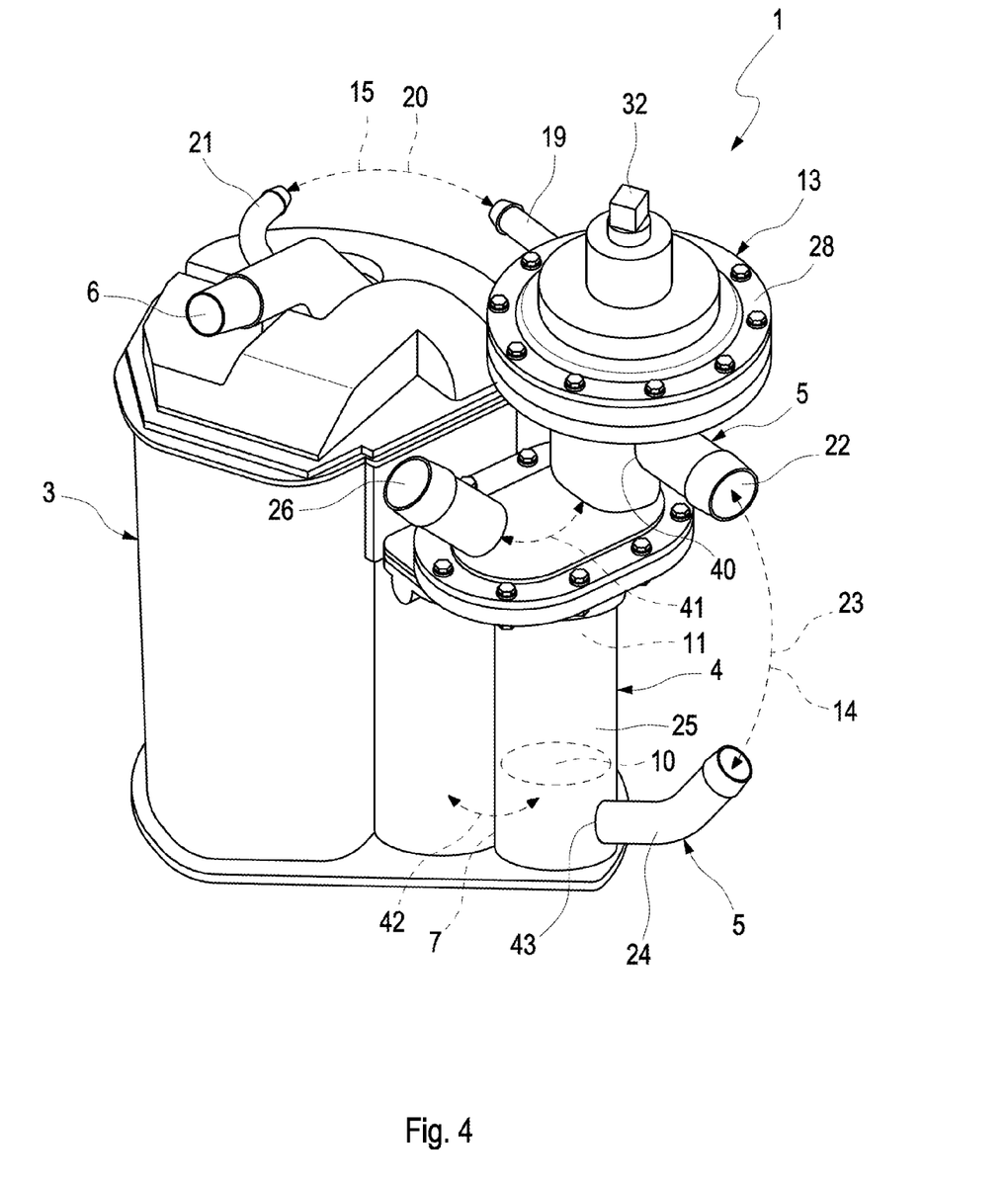
FIG. 4 shows a perspective view of a deaeration and aeration system.
Figure 5:
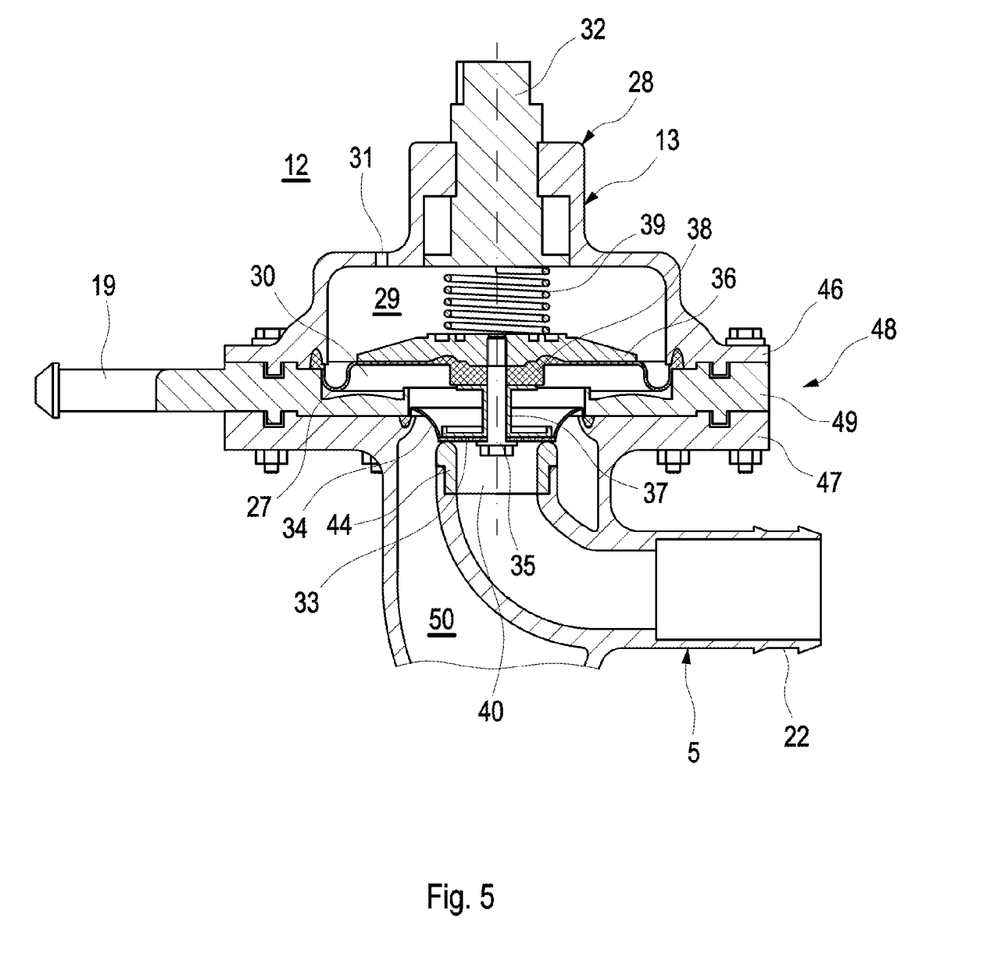
FIG. 5 shows a simplified sectional view of a deaeration and aeration system in the region of a bypass valve, FIGS. 6-8 each show a sectional view as in FIG. 5, but in a different section plane and in different operating states of the motor vehicle.

According to the FIGS. 4-10, the bypass valve 13 has a control pressure connection 19. The latter is connected to the fuel tank 2 via the aforementioned pneumatic operational connection 15. According to FIG. 4, an embodiment is preferred in which a control pressure path 20, e.g. a hose, connects the control pressure connection 19 with the inlet 6 of the main filter device 3 in a communicating manner. In FIG. 4, said control pressure path 20 is symbolically indicated by a double arrow indicated with a broken line. The control pressure path 20 is connected to the inlet 6 of the main filter device 3 via a pressure tapping connection 21. In the example, the bypass valve 13 has in addition a bypass connection 22 to which a bypass line 23 is connected which is symbolized by a double arrow indicated by a broken line. The bypass line 23 is also connected to a further bypass connection 24 which is connected in the region of the inlet 10 of the additional filter device 4 to a housing 25 of the additional filter device 4. The housing 25 of the additional filter device 4 may also be designated hereinafter as filter housing 25. Furthermore, an ambient air connection 26 is indicated in FIG. 4 to which a line running to the environment 12 can be connected.

In the example of FIG. 4, the bypass line 23 is laid externally. However, also conceivable is, in principle, an embodiment in which the bypass line 23, at least partially, is laid internally, whereby it can be structurally integrated into the housing 25 of the additional filter device 4 and/or in a housing 28 of the bypass valve 13. For example, a channel, which is not shown here, can be arranged within the housing 25 of the additional filter device 4, which channel runs parallel to the additional chamber 55 and bypasses the storage material accommodated therein.

According to the FIGS. 5-10, the bypass valve 13 has a control membrane 27. The same is arranged in the housing 28 of the bypass valve 13 in such a manner that it separates within said housing 28 an ambient pressure chamber 20 from a control pressure chamber 30 in a gas-tight manner. The ambient pressure chamber 29 communicates, for example, via an opening 31 with the environment 12. Likewise, a leakage between the housing 28 and a setscrew 32 can be sufficient to allow a sufficiently quick pressure compensation between the ambient pressure chamber 29 and the environment 12. In the installed state of the deaeration and aeration system 1, the control pressure chamber 30 communicates directly or indirectly with the tank 2. For this purpose, the control pressure connection 19 communicates with the control pressure chamber 30. Further, the bypass valve 13 contains a valve member 33 which is drive-coupled with the control membrane 27. The drive coupling takes place in such a manner that the valve member 33 can carry out a stroke. For this, the valve member 33 works together with the bypass 5 in such a manner that it controls, in dependence on its stroke and the bypass 5, the cross-section of the bypass 5 through which a flow can pass. Thus, the pressure difference between ambient pressure chamber 29 and control pressure chamber 30 ultimately controls the bypass 5.

In the preferred embodiment shown here, the bypass valve 13 is additionally equipped with a sealing membrane 34. Said sealing membrane 34 is arranged in the housing 28 in such a matter that it closes the control pressure chamber 30 at a side facing away from the ambient pressure chamber 29 in a gastight manner. Furthermore, said sealing membrane 34 is coupled with the valve member 33. In the example, the sealing membrane 34 itself forms the valve member 33. In particular, the valve member 33 and the sealing membrane 34 are implemented as integral unit. For example, the valve member 33 is formed by a disk-shaped central section of the sealing membrane 34. The drive coupling between the valve member 33 and the control membrane 27 is carried out, for example, via a coupling screw 35 which extends through the valve member 33 and the control membrane 27 and is screwed together with a retaining plate 36 arranged in the control pressure chamber 29. Moreover, the coupling screw 35 extends through a spacer sleeve 37 which supports the valve member 33 in the control pressure chamber 30 at a central region of the control membrane 27. Further, the retaining plate 36 is supported at the setscrew 32 via a biasing spring 39. By rotating the setscrew 32, the pre-load of the biasing spring 38 can be adjusted. Hereby, a switching pressure of the switching pressure difference of the bypass 13, above which pressure the latter opens, can be adjusted.

Figure 9:
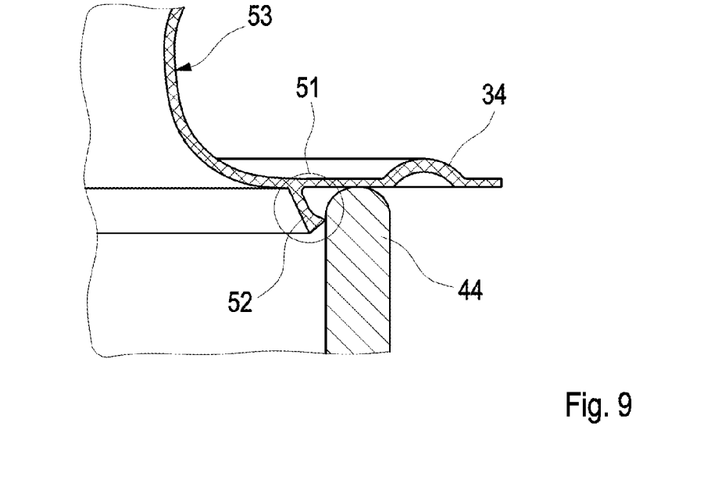
FIG. 9 shows an enlarged sectional view in the region of a valve seat in another embodiment.

According to another embodiment which is indicated here in FIG. 9, the control membrane 27 and the sealing membrane 34 can be integrally formed on a double membrane body 52. Said double membrane body 52 can comprise the spacer sleeve 37. For this purpose, for example, the two membranes 27, 34 are injection molded on the spacer 37.

The bypass valve 13 is suitably arranged at an intake point 40 of the bypass 5, through which intake point the bypass 5 is connected to an outlet path 41 which is indicated in FIG. 4 by a double arrow drawn with a broken line. Said outlet path 41 is connected to the outlet 11 of the additional filter device 4 in a communicating manner. Also, in FIG. 4, a connection path 42 is indicated by a further double arrow drawn with a broken line. Said connection path 42 connects the outlet 7 of the main filter device 3 to the inlet 10 of the additional filter device 4. A branch-off point 43 of the bypass 5 is connected to said connection path 42, thus is arranged downstream of the outlet 7 and upstream of the inlet 10.

Figure 6:
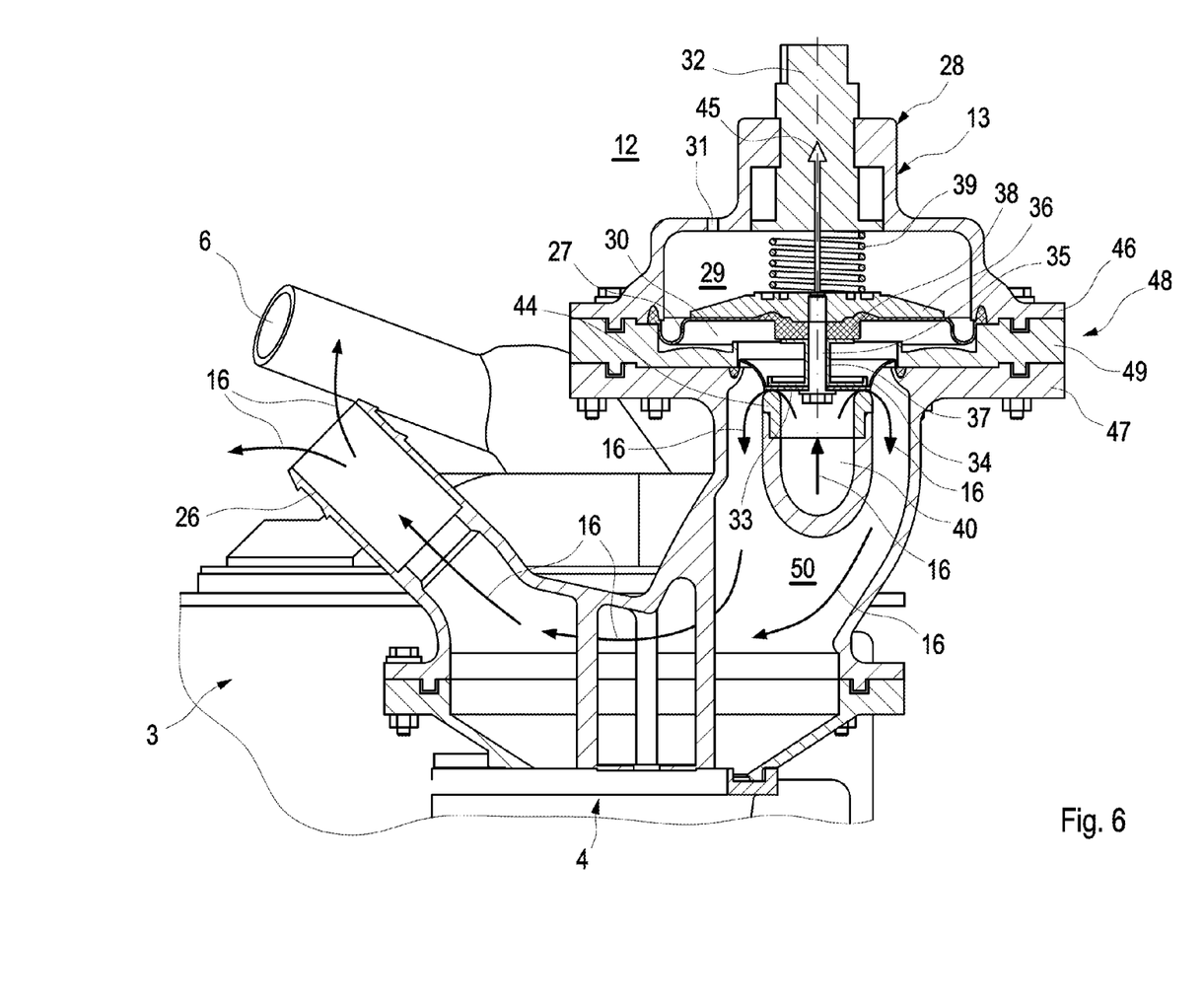

The bypass valve 13 is configured in such a manner that it allows the different operating states or switching states which are explained in more detail hereinafter by means of the FIGS. 6-8. In particular, it is configured in such a manner that it biases the valve member 33 by means of the biasing spring 39 into the closed position, whereby the switching pressure difference is defined which has to prevail between the control pressure chamber 30 and the ambient pressure chamber 29 in order that the valve member 33 can lift off a valve seat 44 against the closing force of the biasing spring 39. If the pressure difference between tank 2 and environment 12 lies below said predetermined switching pressure, the bypass valve 13 blocks the bypass 5. However, if said pressure difference between tank 2 and environment 12 is greater than the mentioned switching pressure difference, the bypass valve 13 opens the bypass 5. The switching pressure difference is dimensioned in such a manner that it is less than a pressure difference which usually occurs during refueling between tank 2 and environment 12. For the bypass valve 13 and the deaeration and aeration system 1 equipped therewith, this result in the following operational mode:

FIG. 6 shows the situation which arises during a refueling process. Analog to FIG. 1, arrows 16 indicate again the gas flow which arises within the deaeration and aeration system 1. During refueling, a comparatively high amount of gas is displaced from the tank 2 within a relatively short time. Since, as indicated, the additional filter device 4 preferably has a relatively high flow resistance, this results in a corresponding pressure increase in tank 2. The tank 2 communicates via the inlet 6 of the main filter device 3 and via the coupling connection 21 with the control connection 19 and thereby with the control pressure chamber 30. Accordingly, the pressure in the control pressure chamber 30 increases correspondingly. At sufficient overpressure in the control pressure chamber 30 with respect to the ambient pressure chamber 29 in which the ambient pressure prevails, the forces acting on the control membrane 27 overcome the closing forces of the biasing spring 39. Consequently, the control membrane 27 moves against the closing force of the biasing spring 39. Due to the coupling with the valve member 33, the valve member 33 carries out a stroke by means of which it lifts off the valve seat 44. A corresponding stroke movement of the control membrane 27 and the valve member 33 is indicated in FIG. 6 by an arrow 45. With the bypass valve open, the gas escaping from the tank 2 and flowing through the main filter 3 can flow through the bypass 5 by bypassing the additional filter device 4 and gets into the outlet path 41. During said refueling process, the cleaning of the gas is carried out substantially only by the main filter device 3.

Figure 7:
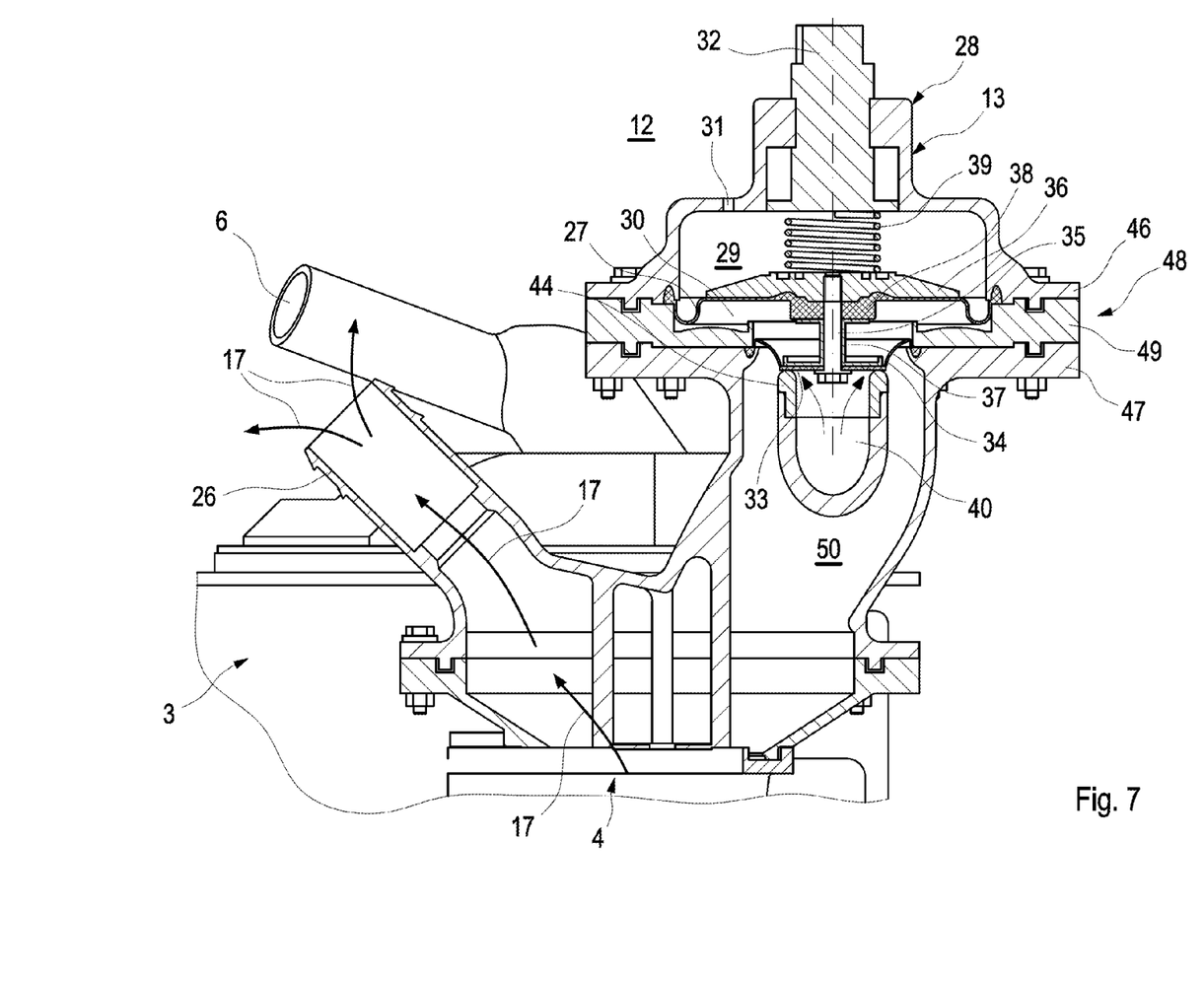

FIG. 7 shows the situation which arises during the standstill of the vehicle and with the internal combustion engine 9 turned off. When the vehicle is stationary, the tank 2 is substantially under ambient pressure. Due to thermal expansion effects within the tank 2, a comparatively low overpressure can be generated which, however, lies below the switching pressure difference of the bypass valve 13. In FIG. 7, arrows 17 indicate, analog to FIG. 2, a gas movement or gas flow which can occur during said vehicle standstill and transports fuel vapor from tank 2 toward the environment 12. Since the pressure between control pressure chamber 30 and ambient pressure chamber 29 is largely compensated, the closing force of the biasing spring 39 is predominant in any case so that the bypass valve 13 closes the bypass 5. Consequently, the gas movement is forced, after flowing through the main filter device 3, to flow also through the additional filter device before the gas reaches the outlet path. Hereby, a sufficient removal of the entrained pollutants can be achieved for the vehicle standstill.

Figure 8:
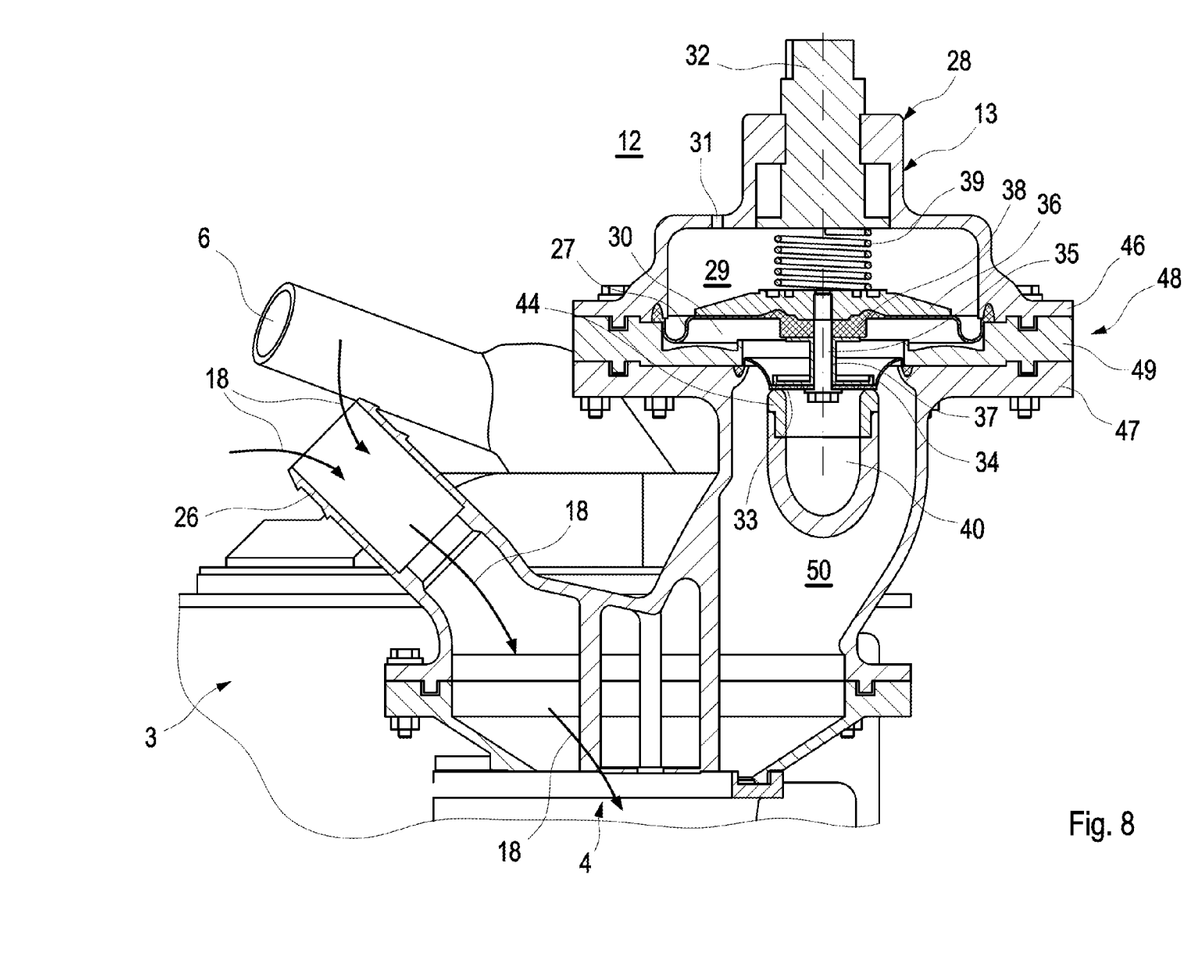

FIG. 8 shows the situation which arises during a driving operation of the vehicle. On the intake side of the main filter device 3, thus in particular at the inlet 6, a negative pressure is generated. For example, a section of the fresh air system 8 is connected in a communicating manner to the intake side of the main filter device 3 or, respectively, the tank 2. The negative pressure generated in the tank 2 is thus also applied to the inlet 6. Said negative pressure thus prevails also in the control pressure chamber 30 whereby the closing forces acting on the control membrane 27 are increased. Consequently, the bypass valve 13 remains closed. Accordingly, the air sucked from the environment 12 has to flow successively first through the additional filter device 4 and subsequently through the main filter device 3 in order to reach the tank 2 or the internal combustion engine 9 via the inlet side of the main filter device 3, in particular via the inlet 6 of the latter. Analog to FIG. 3, a corresponding gas backflow is indicated in FIG. 8 by arrows 18. Through the backflow with comparatively clean air, sorbed hydrocarbons are desorbed which results in a regeneration of the filter devices 3 and 4.

In the embodiments shown here, the valve seat 44 is formed on a separate seat component which hereinafter may also be designated with 44. The seat component 44 is inserted in the region of the intake point 40 into the housing 28 of the bypass valve 13. It can be made of a different material, e.g. metal, than the housing 28 which is preferably made of a plastic. For example, at the seat component 44, a particularly high-quality and durable seat face can be implemented which interacts with the sealing membrane 34. Alternatively, the valve seat 44 can also be integrally formed on the housing 28 of the bypass valve 13.

According to the FIGS. 5-8, the housing 28 of the bypass valve 13, hereinafter also designated as valve housing 28, is assembled from a plurality of parts. Shown are an upper part 46 and a lower part 47 which are connected to one another via a flange connection 48. Further provided in the example is an intermediate part 49 which is arranged between upper part 46 and lower part 47. In the example, the intermediate part 49 is integrated in the flange connection 48 and fixedly connected via the same to the upper part 46 and the lower part 47.

The intermediate part 49 has a control pressure connection 19 and allows the communicating connection of the same to the control pressure chamber 30. Preferably, the control pressure connection 19 is integrally formed on the intermediate part 49.

For opening the bypass 5, the sealing membrane 34 lifts off the valve seat 44, whereby a cylindrical intake area is formed through which the hydrocarbon-containing gas flows from the bypass 5 into an overflow channel 50. Within the valve housing 28, the overflow channel 50 connects the intake point 40 to the ambient air connection 26, whereby the gas flow bypasses the additional filter device 4 according to the arrows 16 in FIG. 6. Advantageously, the stroke of the sealing membrane 34 is limited to a maximum stroke which is dimensioned in such a manner that the aforementioned intake area has the same size or is larger than the flow cross-section of the bypass 5. Additionally or alternatively, the overflow channel 50 can have a flow cross-section which has the same size as the flow cross-section of the bypass 5. Additionally or alternatively, the overflow channel 50 can have a flow cross-section which has the same size as the ambient air connection 26 and/or the flow cross-section of the intake 6 connected to the tank 2.

Additionally or alternatively it can be provided to dimension the control pressure connection 19 smaller with respect to its flow cross-section than the one of the ambient air connection 26 and/or the inlet 6 connected to the tank 2 and/or the bypass 5.

According to FIG. 9, in a region 51, the sealing membrane 34 can have a sealing lip 52 which, for closing the intake point 40, abuts radially in a sealing manner on a cylindrical inner side of a nozzle-shaped end section of the bypass 5, wherein the end section comprises the valve seat 44.

Figure 10:
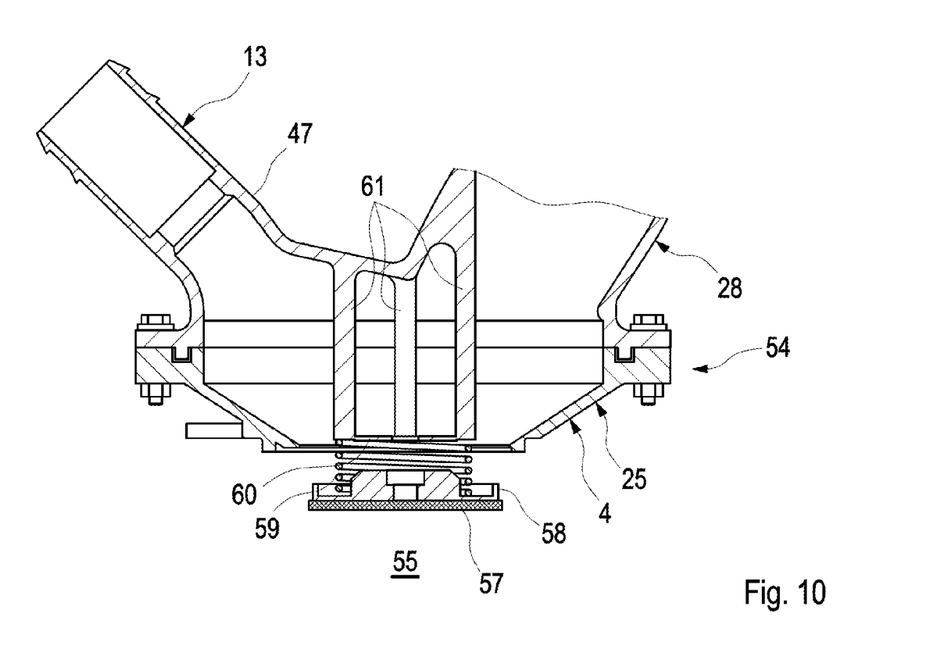
FIG. 10 shows an enlarged sectional view in the region of an interface between a bypass valve and an additional filter device.

According to FIG. 10, the bypass valve 13 can be connected to the additional filter device 4 via an interface 54 which is configured here as flange connection. In particular, the valve housing 28 or its lower part 47 is connected to the filter housing 25 via the interface 54. The storage material contained in the form of bulk material in the additional chamber 55 can be retained on the side facing the bypass 13 by means of a fleece 57 and can be biased into the interior of the additional chamber 55. For this purpose, the fleece 57 is formed complementary to the inner cross-section of the additional chamber 55 and is supported on a fleece tensioner 58, which is in particular disk-shaped. Said fleece tensioner 58 is driven by means of a biasing spring 59 into the interior of the additional chamber 54. The biasing spring 59 is supported, on the one hand, on the fleece tensioner 58 and, on the other, on a spring receptacle 60 which is in particular disk-shaped. In the example, the spring receptacle 60 is supported on the filter housing 28 or its lower part 47 via a plurality of columns 61. Advantageously, only the columns 61 or the columns 61 and also the spring receptacle 60 are integrally formed on the filter housing 28 or its lower part 47.

Although a purely mechanically working bypass valve 13 for controlling and regulating the pressures and flows has been introduced herein, the deaeration and aeration system 1 can also be equipped with an electrical bypass valve which interacts with suitable pressure sensors and the like.

According to another aspect, the present invention relates also to a method for operating a deaeration and aeration system 1 of a fuel tank 2 of a motor vehicle with an internal combustion engine 9. With this method, gas escaping from the tank 2 during a standstill of the vehicle with the internal combustion engine 9 turned off is conveyed through a main filter device 3 and subsequently through an additional filter device 4 and into the environment 12. With this method, during a driving operation of the vehicle and with the internal combustion engine 9 turned on, air from the environment 12 is sucked in through the additional filter device 4 and subsequently through the main filter device 3. This method can be characterized in that during the refueling process, gas displaced from the tank 2 is conveyed through the main filter device 3 and subsequently, by bypassing the additional filter device 4, through a bypass 5 and into the environment 12 of the vehicle.

Optionally, the method can be improved in that the bypass 5 is controlled by means of a bypass valve 13. Additionally or alternatively, it can be provided that the bypass valve 13 is actuated in dependence on a pressure prevailing in the tank 2.

The invention claimed is:

1. A fuel tank deaeration and aeration system, comprising:
   a first main filter device having an inlet and an outlet, wherein the inlet is in fluid communication with a fuel tank; and
   a second additional filter device having an inlet and an outlet, wherein the inlet is in fluid communication with the outlet of the main filter device, and the additional filter device outlet is in fluid communication with an environment of a vehicle, and wherein a bypass valve controls a bypass, which bypasses the additional filter device;
   wherein a branch-off point of the bypass between the outlet of the main filter device and the inlet of the additional filter device is arranged at a connection path connecting said outlet to said inlet.

2. The fuel tank deaeration and aeration system according to claim 1, wherein the bypass valve works without external energy.

3. The fuel tank deaeration and aeration system according to claim 1, wherein the bypass valve is actuated in dependence on the pressure prevailing in the tank.

4. The fuel tank deaeration and aeration system according to claim 1, wherein the bypass valve has a control pressure connection, which is connected in a communicating manner via a control pressure path to the inlet of the main filter device.

5. The fuel tank deaeration and aeration system according to claim 1, wherein the bypass valve has a control membrane which separates, in a housing of the bypass valve, an ambient pressure chamber connected in a communicating manner to the environment from a control pressure chamber which, in the installed state, is at least one of directly and indirectly connected in a communicating manner to the tank, and which control membrane is drive-coupled with a valve member of the bypass valve, which valve member, in dependence on its stroke, controls the bypass.

6. The fuel tank deaeration and aeration system according to claim 5, wherein the bypass valve has a sealing membrane, which closes the control pressure chamber at a side facing away from the ambient pressure chamber, and which is at least one of coupled with the valve member, forms the valve member, and is an integral part of the valve member.

7. The fuel tank deaeration and aeration system according to claim 6, wherein the control membrane and the sealing membrane are integrally formed on a double membrane body.

8. The fuel tank deaeration and aeration system according to claim 1, wherein the bypass valve is arranged at an intake point of the bypass, wherein the intake point of the bypass is connected to an outlet path, which is fluidly connected to the outlet of the additional filter device.

9. The fuel tank deaeration and aeration system according to claim 1, wherein the bypass valve is configured such that it blocks the bypass, at a pressure difference between tank and environment, which is smaller than a predetermined switching pressure difference, and the bypass valve opens the bypass at a pressure difference, which is greater than the switching pressure difference, wherein the switching pressure difference is smaller than a pressure difference that arises between tank and environment during refueling of the fuel tank.

10. The fuel tank deaeration and aeration system according to claim 1, wherein in the installed state, a fresh air system of an internal combustion engine is connected to at least one of the tank, the connection of the main filter device, and an additional connection of the main filter device.

11. The fuel tank deaeration and aeration system according to claim 1, wherein the additional filter device has a chamber filled with at least one of activated carbon, a suitable adsorber medium, and a suitable absorber medium.

12. The fuel tank deaeration and aeration system according to claim 2, wherein the bypass valve is actuated in dependence on the pressure prevailing in the tank.

13. The fuel tank deaeration and aeration system according to claim 2, wherein the bypass valve has a control pressure connection in fluid communication with a control pressure path to the inlet of the main filter device.

14. The fuel tank deaeration and aeration system according to claim 2, wherein the bypass valve has a housing and control membrane, which separates an ambient pressure chamber in the housing, from a control pressure chamber which, in the installed state, is at least one of directly and indirectly connected in a communicating manner to the tank, wherein the ambient pressure chamber is in fluid communication with the environment, the control membrane is drive-coupled with a valve member of the bypass valve, and wherein the valve member depends on it stroke to control the bypass.

15. The fuel tank deaeration and aeration system according to claim 14, wherein the bypass valve has a sealing membrane, which closes the control pressure chamber at a side facing away from the ambient pressure chamber, and which is at least one of coupled with the valve member, forms the valve member, and is an integral part of the valve member.

16. The fuel tank deaeration and aeration system according to claim 15, wherein the control membrane and the sealing membrane are integrally formed on a double membrane body.

17. The fuel tank deaeration and aeration system according to claim 2, wherein the bypass valve is arranged at an intake point of the bypass, wherein the intake point of the bypass is connected to an outlet path, which is fluidly connected to the outlet of the additional filter device.

18. The fuel tank deaeration and aeration system according to claim 2, wherein a branch-off point of the bypass between the outlet of the main filter device and the inlet of the additional filter device is arranged at a connection path connecting said outlet to said inlet.

19. A fuel tank deaeration and aeration system, comprising:
a first main filter device having an inlet and an outlet, wherein the inlet is in fluid communication with a fuel tank; and
a second additional filter device having an inlet and an outlet, wherein the inlet is in fluid communication with the outlet of the main filter device, and the additional filter device outlet is in fluid communication with an environment of a vehicle, and wherein a bypass valve controls a bypass, which bypasses the additional filter device;
wherein the bypass valve has a control pressure connection, which is connected in a communicating manner via a control pressure path to the inlet of the main filter device.

20. The fuel tank deaeration and aeration system according to claim 19, wherein the bypass valve is configured such that it blocks the bypass, at a pressure difference between tank and environment, which is smaller than a predetermined switching pressure difference, and the bypass valve opens the bypass at a pressure difference, which is greater than the switching pressure difference, wherein the switching pressure difference is smaller than a pressure difference that arises between tank and environment during refueling of the fuel tank.

21. A fuel tank deaeration and aeration system, comprising:
a first main filter device having an inlet and an outlet, wherein the inlet is in fluid communication with a fuel tank; and
a second additional filter device having an inlet and an outlet, wherein the inlet is in fluid communication with the outlet of the main filter device, and the additional filter device outlet is in fluid communication with an environment of a vehicle, and wherein a bypass valve controls a bypass, which bypasses the additional filter device;
wherein the bypass valve has a control membrane which separates, in a housing of the bypass valve, an ambient pressure chamber connected in a communicating manner to the environment from a control pressure chamber which, in the installed state, is at least one of directly and indirectly connected in a communicating manner to the tank, and which control membrane is drive-coupled with a valve member of the bypass valve, which valve member, in dependence on its stroke, controls the bypass.

22. A fuel tank deaeration and aeration system, comprising:
a first filter in fluid communication with a fuel tank; and
a second filter in fluid communication with:
the first filter via a line; and
an environment of a vehicle via a valve;
wherein the valve is in fluid communication with the line at a branch-off point of the line, and the valve controls a flow from the line that bypasses the second filter.

23. A fuel tank deaeration and aeration system, comprising:
a first filter in fluid communication with a fuel tank; and
a second filter in fluid communication with:

the first filter via a line; and an environment of a vehicle via a valve;

wherein the valve has a control pressure connection, which is connected in a communicating manner via a control pressure path to the first filter.

24. A fuel tank deaeration and aeration system, comprising:

a first filter in fluid communication with a fuel tank; and a second filter in fluid communication with:

the first filter via a line; and an environment of a vehicle via a valve;

wherein the valve has a control membrane which separates, in a housing of the valve, an ambient pressure chamber connected in a communicating manner to the environment from a control pressure chamber which, in the installed state, is at least one of directly and indirectly connected in a communicating manner to the fuel tank, and which control membrane is drive-coupled with a valve member of the valve, which valve member, in dependence on its stroke, controls a bypass about the second filter.

\* \* \* \* \*